United States Patent
Arai et al.

(10) Patent No.: US 11,551,838 B2
(45) Date of Patent: Jan. 10, 2023

(54) GRAIN-ORIENTED ELECTRICAL STEEL SHEET

(71) Applicant: NIPPON STEEL CORPORATION, Tokyo (JP)

(72) Inventors: Satoshi Arai, Tokyo (JP); Hideyuki Hamamura, Tokyo (JP); Shunsuke Okumura, Tokyo (JP); Kimihiko Sugiyama, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 199 days.

(21) Appl. No.: 16/961,286

(22) PCT Filed: Feb. 8, 2019

(86) PCT No.: PCT/JP2019/004656
§ 371 (c)(1),
(2) Date: Jul. 10, 2020

(87) PCT Pub. No.: WO2019/156220
PCT Pub. Date: Aug. 15, 2019

(65) Prior Publication Data
US 2021/0074456 A1    Mar. 11, 2021

(30) Foreign Application Priority Data
Feb. 8, 2018   (JP) .............................. JP2018-021104

(51) Int. Cl.
*H01F 1/147*    (2006.01)
*B23K 26/364*    (2014.01)
*C22C 38/00*    (2006.01)
*C22C 38/02*    (2006.01)
*C22C 38/04*    (2006.01)
(Continued)

(52) U.S. Cl.
CPC ........... *H01F 1/147* (2013.01); *B23K 26/364* (2015.10); *C22C 38/001* (2013.01);
(Continued)

(58) Field of Classification Search
None
See application file for complete search history.

(56) References Cited

U.S. PATENT DOCUMENTS

2013/0017408 A1    1/2013   Sakai et al.
2018/0036838 A1*   2/2018   Hamamura .......... C21D 8/1294
(Continued)

FOREIGN PATENT DOCUMENTS

CN    108660303 A    10/2018
JP    59-197520 A    11/1984
(Continued)

OTHER PUBLICATIONS

International Search Report for PCT/JP2019/004656 dated Mar. 26, 2019.
(Continued)

*Primary Examiner* — Seth Dumbris
*Assistant Examiner* — Kim S. Horger
(74) *Attorney, Agent, or Firm* — Birch, Stewart, Kolasch & Birch, LLP

(57) ABSTRACT

A grain-oriented electrical steel sheet according to the present invention has a steel sheet surface provided with grooves. An average protrusion height of the surface protrusion extending along a longitudinal direction of the groove is more than 5 μm and not more than 10 μm. When the surface protrusion is viewed in a cross section including the longitudinal direction of the groove and a normal direction of the steel sheet surface, the surface protrusion includes specific portions each having a height of 50% or more with respect to a height of each peak point appearing on a profile line of the surface protrusion. In the longitudinal direction of the groove, the total length of the specific portions is a length of 30% or more with respect to an overall length of the surface protrusion.

1 Claim, 2 Drawing Sheets

(51) Int. Cl.
   *C22C 38/06*  (2006.01)
   *C22C 38/42*  (2006.01)
   *C22C 38/60*  (2006.01)
   *C21D 6/00*   (2006.01)
   *C21D 8/12*   (2006.01)
   *C21D 9/46*   (2006.01)

(52) U.S. Cl.
   CPC .......... *C22C 38/002* (2013.01); *C22C 38/008* (2013.01); *C22C 38/02* (2013.01); *C22C 38/04* (2013.01); *C22C 38/06* (2013.01); *C22C 38/42* (2013.01); *C22C 38/60* (2013.01); *C21D 6/008* (2013.01); *C21D 8/1222* (2013.01); *C21D 8/1233* (2013.01); *C21D 8/1272* (2013.01); *C21D 9/46* (2013.01); *C21D 2201/05* (2013.01); *C22C 2202/02* (2013.01)

(56) References Cited

U.S. PATENT DOCUMENTS

| | | |
|---|---|---|
| 2018/0066334 A1 | 3/2018 | Mogi et al. |
| 2018/0071869 A1 | 3/2018 | Sakai et al. |
| 2019/0048434 A1 | 2/2019 | Mizumura et al. |
| 2020/0058434 A1 | 2/2020 | Zhao et al. |

FOREIGN PATENT DOCUMENTS

| | | | |
|---|---|---|---|
| JP | 62-53579 B2 | 11/1987 | |
| JP | 62-54873 B2 | 11/1987 | |
| JP | 6-57335 A | 3/1994 | |
| JP | 2001-314986 A | 11/2001 | |
| JP | 2002-292484 A | 10/2002 | |
| JP | 2012-87332 A | 5/2012 | |
| JP | 5234222 B2 | 7/2013 | |
| WO | WO 2006/120985 A1 | 11/2006 | |
| WO | WO 2011/125672 A1 | 10/2011 | |
| WO | WO 2016/171124 A1 | 10/2016 | |
| WO | WO 2016/171130 A1 | 10/2016 | |
| WO | WO-2016171129 A1 * | 10/2016 | ........... B23K 26/364 |
| WO | WO 2017/171013 A1 | 10/2017 | |

OTHER PUBLICATIONS

Written Opinion of the International Searching Authority for PCT/JP2019/004656 (PCT/ISA/237) dated Mar. 26, 2019.

* cited by examiner

GRAIN-ORIENTED ELECTRICAL STEEL SHEET

TECHNICAL FIELD OF THE INVENTION

The present invention relates to a grain-oriented electrical steel sheet.

Priority is claimed on Japanese Patent Application No. 2018-021104, filed on Feb. 8, 2018, the content of which is incorporated herein by reference.

RELATED ART

In general, a grain-oriented electrical steel sheet refers to a steel sheet in which the orientations of crystal grains in the steel sheet are highly integrated in a {110}<001> orientation and a magnetization easy axis is aligned in a longitudinal direction of the steel sheet. Since the grain-oriented electrical steel sheet has the magnetization easy axis aligned in the longitudinal direction, the electrical steel sheet has low iron loss and excellent magnetization property.

The grain-oriented electrical steel sheet has the structure that magnetic domains (stripe magnetic domains) having a magnetization direction coinciding with the rolling direction are arranged across domain walls. Since many of these domain walls are 180° domain walls, the grain-oriented electrical steel sheet is easily magnetized in the rolling direction. Therefore, even when the grain-oriented electrical steel sheet is in a magnetic field having a relatively small constant magnetizing force, its magnetic flux density is high and its iron loss is low.

Accordingly, the grain-oriented electrical steel sheet is very excellent as an iron core material of a transformer.

W17/50 [W/kg] is generally used as an indicator of the iron loss. W17/50 is a value of the iron loss generated in the grain-oriented electrical steel sheet when AC excitation is performed so that the maximum magnetic flux density becomes 1.7 T at a frequency of 50 Hz. A transformer with higher efficiency can be manufactured by reducing W17/50.

When strains substantially perpendicular to the rolling direction (cross direction) are applied to the grain-oriented electrical steel sheet at a constant period (constant interval), the iron loss thereof is further reduced. In this case, transverse type magnetic domains whose magnetization direction is orthogonal to the rolling direction are formed due to the local strains, and the intervals between the domain walls of the substantially rectangular stripe magnetic domains become narrow due to the energy increment therefrom (the widths of the stripe magnetic domains become small) Since the iron loss (W17/50) has a positive correlation with the interval between the 180° domain walls, the iron loss is reduced by this principle. By the way, in order to eliminate the deterioration of the iron loss due to the processing strain of a wound iron core, the stress relief annealing (annealing at 800° C. for about 2 hours) is performed. Even if a method of reducing the iron loss of the grain-oriented electrical steel sheet using local strains is adopted, an iron loss reduction effect is lost by performing the stress relief annealing. As a method in which the iron loss reduction effect is not lost even when the stress relief annealing is performed, a method of introducing periodic grooves extending in a direction intersecting the rolling direction into the grain-oriented electrical steel sheet is generally used.

For the purpose of reducing the iron loss of an iron core, for example, Patent Document 1 discloses that iron loss is improved by introducing linear defects into a grain-oriented electrical steel sheet before performing final annealing.

Patent Document 2 discloses that grooves are formed on the surface of the electrical steel sheet with high power efficiency by irradiating a continuous wave laser beam having a limited wavelength in order to reduce the iron loss.

Hereinafter, general methods of forming grooves will be described. In a method of using electrolytic etching, for example, a resist film having linear holes is printed on the surface of a cold-rolled sheet by gravure printing, and the resist film is removed after forming grooves by electrolytic etching. In this method, the manufacturing cost increases due to the complexity of the process, and the processing speed is limited.

In a method of using a mechanical tooth mold press, the electrical steel sheet is a very hard steel sheet containing about 3% of Si, and thus the tooth mold is likely to be worn and damaged. Since the groove depth varies when the tooth mold is worn, the iron loss improvement effect becomes non-uniform.

A method of using laser irradiation (referred to as a laser method) has an advantage that high-speed grooving can be performed using a high-power density focused laser beam. Since the processing using the laser method is a non-contact processing, grooving can be performed stably and uniformly by controlling the laser power and the like.

Conventionally, a $CO_2$ laser capable of easily obtaining a relatively high power has been used as a laser light source. The wavelength of the $CO_2$ laser is included in a band of 9 to 11 μm, and a laser light with this wavelength is greatly absorbed by the metal vapor or plasma generated at the processing point (processing position). Therefore, the power of the laser light reaching the surface of the steel sheet is reduced, and the processing efficiency is reduced. Furthermore, plasma or metal vapor heated and expanded by absorbing the laser light acts as a secondary heat source that melts the peripheral portion of the end portion (shoulder portion) of the groove. As a result, the shape of the groove deteriorates due to an increase in the melting amount of the groove (for example, the melt protrusion increases).

PRIOR ART DOCUMENT

Patent Document

[Patent Document 1] Japanese Unexamined Patent Application, First Publication No. S59-197520

[Patent Document 2] Japanese Patent No. 5234222

DISCLOSURE OF THE INVENTION

Problems to be Solved by the Invention

In the conventional groove introduction type SRA-resistant magnetic domain control technology using mechanical machining or electrolytic etching as described above, the iron loss reduction effect of the grain-oriented electrical steel sheet is not obtained sufficiently, and further improvement of the iron loss is required.

The present invention is made in consideration of the above-described circumstances, and an object thereof is to provide a grain-oriented electrical steel sheet capable of reducing iron loss of an iron core.

Means for Solving the Problem

The present invention adopts the following means in order to solve the above problems and achieve the object.

That is, a grain-oriented electrical steel sheet according to an aspect of the present invention has a steel sheet surface provided with grooves. The grain-oriented electrical steel sheet includes a surface protrusion that protrudes from the steel sheet surface in a region expanding outward in a width direction of the groove from a widthwise end portion of the groove. The surface protrusion extends along a longitudinal direction of the groove. An average protrusion height of the surface protrusion is more than 5 μm and not more than 10 μm. When the surface protrusion is viewed in a cross section including the longitudinal direction of the groove and a normal direction of the steel sheet surface, the surface protrusion includes specific portions each having a height of 50% or more with respect to a height of each peak point appearing on a profile line of the surface protrusion. In the longitudinal direction of the groove, a total length of the specific portions is a length of 30% or more with respect to an overall length of the surface protrusion.

Effects of the Invention

According to the above aspect of the present invention, linear elastic stresses are introduced into the grain-oriented electrical steel sheets by the protrusions provided on the steel sheets when laminating the steel sheets in the manufacturing of an iron core. Thereby a magnetic domain control effect equal to or greater than an effect of the groove introduction type magnetic domain control can be obtained. As a result, it is possible to reduce the iron loss of the iron core.

EMBODIMENTS OF THE INVENTION

Figure 1:
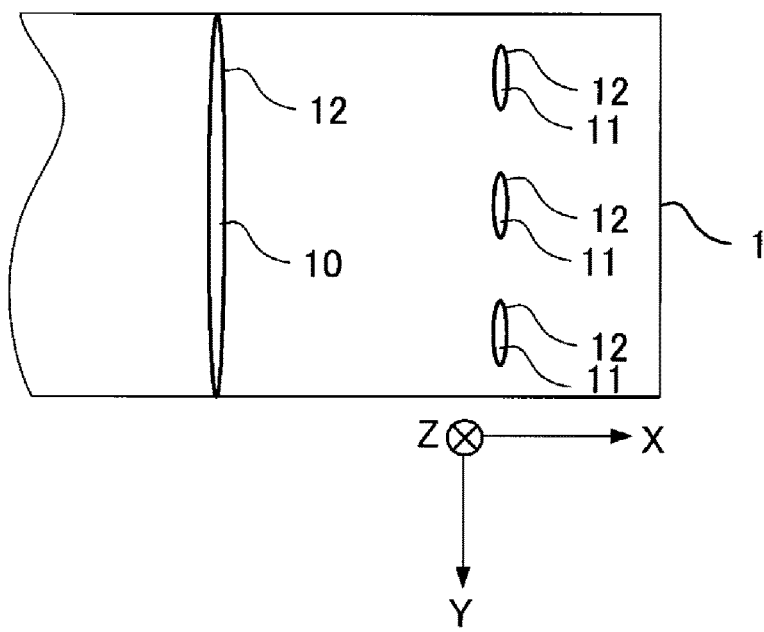
FIG. 1 is a plan view schematically showing an example of a pattern of grooves provided on a steel sheet surface of a grain-oriented electrical steel sheet according to an embodiment of the present invention.

Hereinafter, a grain-oriented electrical steel sheet according to an embodiment of the present invention will be described in detail with reference to the drawings.

The grain-oriented electrical steel sheet according to the present embodiment (hereinafter, simply referred to as the present electrical steel sheet) is a grain-oriented electrical steel sheet having a steel sheet surface provided with grooves. The present electrical steel sheet includes a surface protrusion that protrudes from the steel sheet surface in a region expanding outward in a width direction of the groove from a widthwise end portion of the groove. The surface protrusion extends along a longitudinal direction of the groove. The average protrusion height of the surface protrusion is more than 5 μm and not more than 10 μm. When the surface protrusion is viewed in a cross section including the longitudinal direction of the groove and a normal direction of the steel sheet surface, the surface protrusion includes specific portions each having a height of 50% or more with respect to a height of each peak point appearing on a profile line of the surface protrusion. In the longitudinal direction of the groove, a total length of the specific portions is a length of 30% or more with respect to an overall length of the surface protrusion.

In the following description, terms that specify shapes, geometric conditions, and the degree thereof, for example, "parallel", "perpendicular", "same", and "right angle", values of lengths and angles, and the like are not limited to strict meaning, and are interpreted to include a range in which a similar function can be expected.

In groove formation by laser beam irradiation, a laser beam is absorbed on the surface of the steel sheet, the metal (base metal) of the steel sheet is melted, and fine melted droplets are scattered, or the base metal of the surface of the steel sheet heated to the boiling point evaporates, whereby grooves are formed. The melted material on the surface of the steel sheet is scattered by the pressure of high-temperature metal vapor or plasma at a processing point (laser beam irradiation point). On the other hand, in a case where a large amount of the melted material is generated or in a case where the pressure is small, the melted material cannot be scattered completely, and the melted material adheres to the peripheral portion of the formed groove to generate surface protrusions (protrusions, melted protrusions, and the like).

In a laser groove formation test using a $CO_2$ pulse laser (large irradiation diameter), in a region (the peripheral portion of a groove) expanding outward in a width direction of the groove from a widthwise end portion of the groove, surface protrusions (protrusions, melted protrusions, and the like) protruding from the steel sheet surface and having a height of 20 μm or more are generated, and a magnetic measurement (Epstein measurement under stacked pressure) in which a compressive force is applied to the steel sheet surface shows an iron loss deterioration of about 40%, so that practical utilization cannot be achieved.

In a laser groove forming technique using a continuous irradiation laser with a small irradiation diameter, since a width of a groove formed on the steel sheet surface is small, the generation of protrusions at the focal position can be substantially suppressed. However, when the distance between the steel sheet surface and a laser irradiation device varies and a defocus state is incurred, the generation of protrusions on the steel sheet surface becomes significant.

In a groove introduction type SRA-resistant magnetic domain control technique using a laser, when the laser is out of focus, protrusions generated in the form of protruding from the surface of a steel sheet at the peripheral portion of a groove become large. There is a possibility that the protrusions may cause an interlayer short circuit, an increase in core loss due to stress acting upon the formation of a stacked iron core, a decrease in lamination space factor, and the like.

In addition, in the SRA-resistant magnetic domain control by laser groove formation, it is considered that when the protrusions in the peripheral portion the groove formed by the laser groove formation are too large, iron loss deterioration is incurred by local elastic deformation in the electrical steel sheet due to the compressive force on the steel sheet surface during lamination of an iron core.

In contrast, the present inventors have found that when the form of the surface protrusion formed on the peripheral portion of the groove satisfies the following two conditions, linear elastic strains similar to a strain introduction type laser magnetic domain control are introduced into the grain-oriented electrical steel sheets when the stacked iron core is formed and thereby the iron loss of the iron core can be further reduced.

(Condition 1) The average protrusion height of the surface protrusion is more than 5 μm and not more than 10 μm.

(Condition 2) When the surface protrusion is viewed in a cross section including the longitudinal direction of the groove and a normal direction of the steel sheet surface, the surface protrusion includes specific portions each having a height of 50% or more with respect to a height of each peak point appearing on a profile line of the surface protrusion. Additionally, in the longitudinal direction of the groove, a total length of the specific portions is a length of 30% or more with respect to an overall length of the surface protrusion.

Hereinafter, each configuration of the present electrical steel sheet will be described.

(1) Basic Configuration of Present Electrical Steel Sheet

The present electrical steel sheet has a base steel sheet, and may have a coating on the surface of the base steel sheet as necessary. Examples of the coating include a glass film and a tension insulation coating.

The base steel sheet is a steel sheet in which the orientations of crystal grains in the base steel sheet are highly integrated in a {110}<001> orientation, and has excellent magnetic characteristics in a rolling direction thereof.

The chemical composition of the base steel sheet is not particularly limited, and an appropriate chemical composition can be selected from known chemical compositions as grain-oriented electrical steel sheets and used. Hereinafter, an example of a preferable chemical composition of the base steel sheet will be described, but the chemical composition of the base steel sheet is not limited thereto.

For example, the base steel sheet preferably contains, as a chemical composition, by mass %, Si: 0.8% to 7%, C: more than 0% and equal to or less than 0.085%, acid-soluble Al: 0% to 0.065%, N: 0% to 0.012%, Mn: 0% to 1%, Cr: 0% to 0.3%, Cu: 0% to 0.4%, P: 0% to 0.5%, Sn: 0% to 0.3%, Sb: 0% to 0.3%, Ni: 0% to 1%, S: 0% to 0.015%, Se: 0% to 0.015%, and a remainder consisting of Fe and impurities. The chemical composition of the base steel sheet is a preferable chemical composition for controlling the base steel sheet to a Goss texture in which the crystal orientations are integrated in a {110}<001> orientation. Among the elements in the base steel sheet, Si and C are base elements, and acid-soluble Al, N, Mn, Cr, Cu, P, Sn, Sb, Ni, S, and Se are optional elements. Since these optional elements may be contained according to the purpose, there is no need to limit the lower limit, and the optional elements may not be contained substantially. In addition, even if these optional elements are contained as impurities, the effects of the present invention are not impaired. In the base steel sheet, the remainder of the base elements and the optional elements consists of Fe and impurities.

In the present embodiment, the "impurities" mean elements that are unavoidably incorporated from ore, scrap, a manufacturing environment, or the like as a raw material when a base steel sheet is industrially manufactured.

In addition, a grain-oriented electrical steel sheet generally undergoes purification annealing during secondary recrystallization. In the purification annealing, inhibitor-forming elements are discharged to the outside of the system. In particular, the concentrations of N and S are significantly reduced, and become 50 ppm or less. The concentration reaches 9 ppm or less, and furthermore, 6 ppm or less under ordinary purification annealing conditions, and reaches a degree (1 ppm or less) that cannot be detected by general analysis when purification annealing is sufficiently performed.

The chemical composition of the base steel sheet may be measured by a general steel analysis method. For example, the chemical composition of the base steel sheet may be measured using inductively coupled plasma-atomic emission spectrometry (ICP-AES). Specifically, for example, the chemical composition can be specified by acquiring a 35 mm square test piece from the center position of the base steel sheet after the coating is removed, and performing measurement under conditions based on a calibration curve prepared in advance by using ICPS-8100 (a measuring device) manufactured by Shimadzu Corporation, or the like. C and S may be measured using a combustion-infrared absorption method, and N may be measured using an inert gas fusion-thermal conductivity method. The chemical composition of the base steel sheet is a composition obtained by using a steel sheet obtained by removing a glass film, a phosphorus-containing coating, and the like described below from a grain-oriented electrical steel sheet by a method described below as the base steel sheet, and analyzing the composition thereof.

A method of manufacturing the base steel sheet is not particularly limited, and a method of a grain-oriented electrical steel sheet known in the related art can be appropriately selected. As a preferred specific example of the manufacturing method, for example, a method in which a slab containing 0.04 to 0.1 mass % of C and having the chemical composition of the base steel sheet as other elements is heated to 1000° C. or higher, subjected to hot rolling, thereafter subjected to hot-band annealing as necessary, and then subjected to one cold rolling or two or more cold rollings with process annealing therebetween to obtain a cold-rolled steel sheet, and the cold-rolled steel sheet is subjected to decarburization annealing by being heated to 700° C. to 900° C. in, for example, a wet hydrogen-inert gas atmosphere, further subjected to nitriding annealing as necessary, and subjected to final annealing at about 1000° C. can be adopted.

The sheet thickness of the base steel sheet is not particularly limited, but may be 0.10 mm to 0.50 mm, or 0.15 mm to 0.35 mm.

For example, an oxide film containing one or more oxide selected from forsterite ($Mg_2SiO_4$), spinel ($MgAl_2O_4$), and cordierite ($Mg_2Al_4Si_5O_{16}$) is used as the glass film.

A method of forming the glass film is not particularly limited, and can be appropriately selected from known methods. For example, in a specific example of the method of manufacturing the base steel sheet, a method of applying an annealing separating agent containing magnesia (MgO) as a primary component to the cold-rolled steel sheet and then performing the final annealing thereon may be adopted. The annealing separating agent also has an effect of suppressing sticking between steel sheets during final annealing. For example, in a case where the final annealing is performed by applying the annealing separating agent containing magnesia, the annealing separating agent reacts with silica contained in the base steel sheet, and a glass film containing forsterite ($Mg_2SiO_4$) is formed on the surface of the base steel sheet.

The coating thickness of the glass film is not particularly limited, but may be 0.5 μm to 3 μm.

(2) Groove Formation Pattern and Form of Surface Protrusion

FIG. 1 is a plan view schematically showing an example of a pattern of grooves provided on a steel sheet surface of the present electrical steel sheet.

Figure 2:
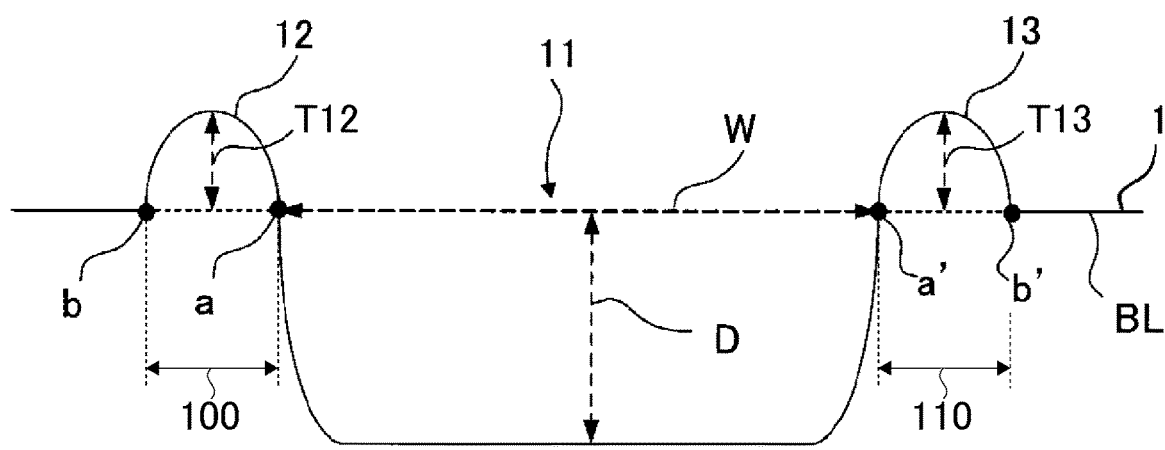
FIG. 2 is a schematic view of a groove and surface protrusions present in a peripheral portion thereof viewed in a cross section orthogonal to a longitudinal direction of the groove.
Figure 2:
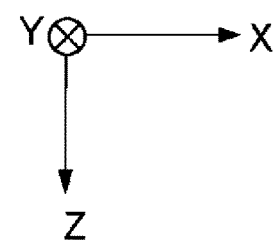

FIG. 2 is a schematic view of a groove (for example, a groove 11) and surface protrusions present in the peripheral portion thereof viewed in a cross section orthogonal to a longitudinal direction of the groove.

Figure 3:
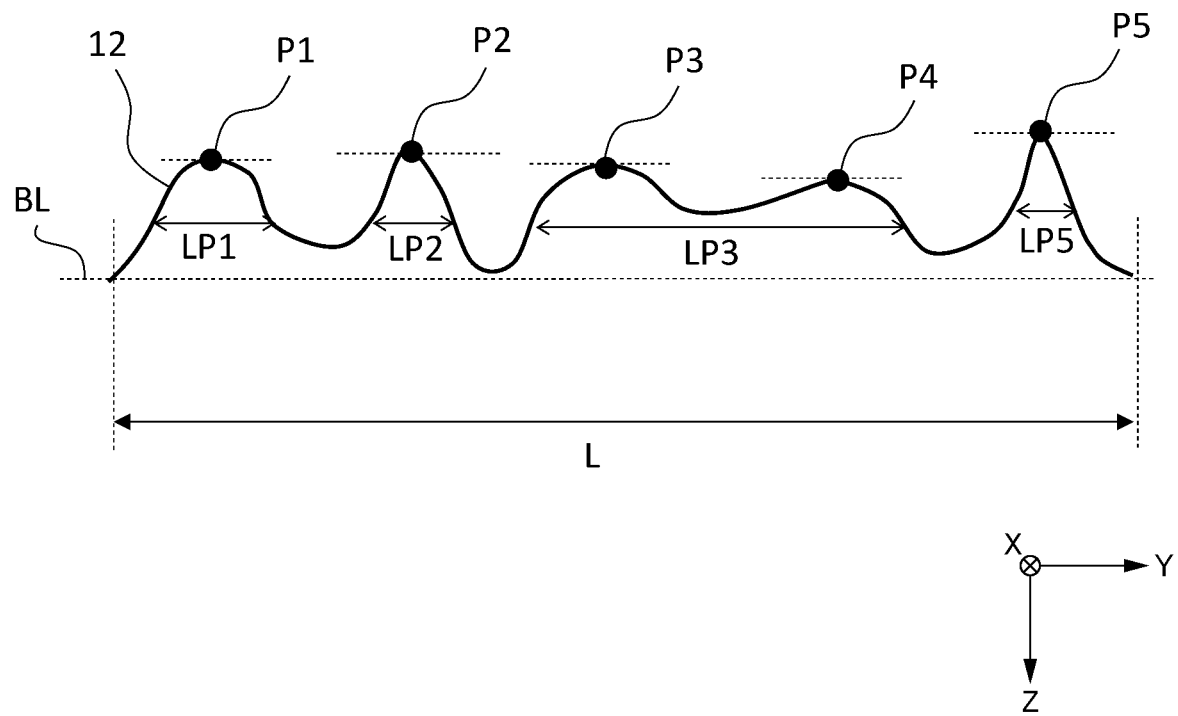
FIG. 3 is a schematic view of surface protrusions present in the peripheral portion of the groove in a cross section including the longitudinal direction of the groove and a normal direction of the steel sheet surface.

FIG. 3 is a schematic view of surface protrusions present in the peripheral portion of the groove (for example, the groove 11) in a cross section including the longitudinal direction of the groove and a normal direction to the steel sheet surface.

In FIG. 1 to FIG. 3, a rolling direction of the present electrical steel sheet 1 is defined as an X-axis direction, a sheet width direction of the present electrical steel sheet 1 (a direction orthogonal to the rolling direction on the same plane) is defined as a Y-axis direction, and a sheet thickness direction of the present electrical steel sheet 1 (a direction orthogonal to the XY plane, that is, a normal direction to the surface of the steel sheet) is defined as a Z-axis direction.

As shown in FIG. 1, a linear groove 10 and intermittent linear grooves 11 are provided on the steel sheet surface (a surface of a base steel sheet) so as to extend along the sheet width direction Y. In other words, in the present embodiment, the longitudinal direction of the groove 10 and the grooves 11 coincides with the sheet width direction Y. Surface protrusions 12 are present in peripheral portions of the groove 10 and the grooves 11.

The grooves 10 and 11 need only be provided so as to intersect, the rolling direction X, and the longitudinal direction of the grooves is not necessarily orthogonal to the rolling direction X. That is, the longitudinal direction of the grooves does not necessarily coincide with the sheet width direction Y.

As shown in FIG. 2, the surface protrusion 12 protruding from the steel sheet surface (reference plane BL) in a peripheral portion 100 of the groove 11 extends along the longitudinal direction of the groove 11, and the surface protrusion 13 protruding from the steel sheet surface (reference plane BL) in a peripheral portion 110 of the groove 11 also extends along the longitudinal direction of the groove 11. In the present embodiment, a width direction of the groove 11 and the rolling direction X coincide with each other.

Here, a region (region between a and b in FIG. 2) that expands outward in the width direction of the groove 11 from one widthwise end portion a of the groove 11 is defined as the peripheral portion 100. In addition, a region (region between a' and b' in FIG. 2) that expands outward in the width direction of the groove 11 from the other widthwise end portion a' of the groove 11 is defined as the peripheral portion 110. As shown in FIG. 2, each of one widthwise end portion a and the other widthwise end portion a' is an intersection of the reference plane BL and the profile line (cross sectional curve) of the groove 11. The point b is the intersection of the reference plane BL and the profile line (cross sectional curve) of the surface protrusion 12 and is a point away from one widthwise end portion a of the groove 11 toward the widthwise outside of the groove 11. The point b' is the intersection of the reference plane BL and the profile line (cross sectional curve) of the surface protrusion 13 and is a point away from the other widthwise end portion a' of the groove 11 toward the widthwise outside of the groove 11.

In FIG. 2, a non-groove forming region (non-groove forming surface) of the grain-oriented electrical steel sheet 1 is set as the reference plane BL (reference height, including the steel sheet surface before the groove is formed) in the sheet thickness direction.

As shown in FIG. 2, the groove 11 is a region formed by performing the groove forming process so that a portion of the base steel sheet is removed from the reference plane BL in a section between one widthwise end portion a and the other widthwise end portion a' of groove 11.

A groove width W of the groove 11 is a direct distance between one widthwise end portion a and the other widthwise end portion a' of the groove 11. A groove depth D of the groove 11 is a depth (distance in the sheet thickness direction Z) from the reference plane BL to a groove bottom. A point which is positioned on the profile line of the groove 11 and is positioned at the deepest position in the sheet thickness direction Z is defined as the groove bottom.

A protrusion height T12 of the surface protrusion 12 is a height (distance in the sheet thickness direction Z) from the reference plane BL to the tip end of the surface protrusion 12. A protrusion height T13 of the surface protrusion 13 is a height (distance in the sheet thickness direction Z) from the reference plane BL to the tip end of the surface protrusion 13.

The protrusion width of the surface protrusion 12 is a direct distance between one widthwise end portion a of the groove 11 and the point b. The protrusion width of the surface protrusion 13 is a direct distance between the other widthwise end portion a' of the groove 11 and the point b'.

For various dimensions, a statistically sufficient number of measurements (for example, 50 measurements) are performed.

In the present embodiment, grooves having a predetermined length extending in a direction intersecting the rolling direction X are formed on the steel sheet surface of the present electrical steel sheet 1 at predetermined intervals by a heat source such as a laser.

In the present embodiment, the direction intersecting the rolling direction X includes a direction orthogonal to the rolling direction X on the XY plane (that is, the sheet width direction Y), and the angle between the sheet width direction Y and the longitudinal direction of the groove may be included in a range of ±45°, or may be included in a range of ±30°.

The shape of the groove may be a linear shape extending in the sheet width direction Y when the present electrical steel sheet 1 is viewed in a plan view, or may be a shape of intermittent lines. The linear shape may be a rectangular shape, an elliptical shape, or the like when observed in an enlarged view.

In a case where the shape of the groove is a shape of intermittent lines, the interval between the grooves adjacent in the sheet width direction Y may be 1 µm to 1000 µm.

On the other hand, the interval between the grooves adjacent in the rolling direction X may be 1 to 10 mm, 3 to 6 mm, or 4 to 5 mm.

In the present embodiment, the interval between the grooves refers to the shortest distance from an end portion (peripheral portion) of the first groove in a predetermined direction (the sheet width direction Y, the rolling direction X, or the like) to an end portion (peripheral portion) of the second groove positioned at a position closest to the first groove.

The average groove depth of the present electrical steel sheet 1 may be 8 to 30 µm, or may be 15 to 25 pun.

The average groove depth is an average of fifty measurement results obtained by measuring the groove depths D of fifty grooves formed on the steel sheet surface.

A method of measuring the groove depth D is as follows. Firstly, a sample is taken from a steel sheet to be measured so that a cross section orthogonal to the longitudinal direction of the groove is exposed on a surface of the sample. After the cross section of the sample is polished so that the groove and its peripheral portions as shown in FIG. 2 appear on the cross section of the sample, the groove depth D (for example, a direct distance from the reference plane BL to the groove bottom in FIG. 2) is measured by observing the cross section using an optical microscope or a scanning electron microscope. The groove depth D is measured with respect to each of fifty grooves formed on the steel sheet to be measured. The average groove depth is a value obtained by averaging the measurement results of fifty groove depths D.

In the present electrical steel sheet 1, the average groove width of the groove widths W may be 1 to 200 µm.

The average groove width is an average of fifty measurement results obtained by measuring the groove widths W of fifty grooves formed on the steel sheet surface.

A method of measuring the groove width W is as follows. Firstly, a sample is taken from a steel sheet to be measured so that a cross section orthogonal to the longitudinal direction of the groove is exposed on a surface of the sample. After the cross section of the sample is polished so that the groove and its peripheral portions as shown in FIG. 2 appear on the cross section of the sample, the groove width W (for example, a direct distance between a and a' in FIG. 2) is measured by observing the cross section using an optical microscope or a scanning electron microscope. The groove width W is measured with respect to each of fifty grooves formed on the steel sheet to be measured. The average groove width is a value obtained by averaging the measurement results of fifty groove widths W.

In the present electrical steel sheet 1, the average protrusion height of the surface protrusion is more than 5 µm and not more than 10 µm. When the average protrusion height of the surface protrusion is 5 µm or less, an effect of reducing iron loss of an iron core is not sufficiently obtained. In view of reducing iron loss of the iron core, the average protrusion height of the surface protrusion is preferably 5.8 µm or more, and is more preferably 6.0 µm or more.

When the average protrusion height of the surface protrusion exceeds 10 µm, the insulation between the laminated steel sheets tends to deteriorate, which is not preferable. Therefore, the upper limit of the average protrusion height of the surface protrusion is 10 The average protrusion height of the surface protrusion is preferably 7.3 µm or less.

The average protrusion height of the surface protrusion is an average of fifty measurement results obtained by measuring the protrusion heights (for example, T12 and T13 in FIG. 2) of fifty surface protrusions formed on the steel sheet surface.

A method of measuring the protrusion height is as follows. Firstly, a sample is taken from a steel sheet to be measured so that a cross section orthogonal to the longitudinal direction of the groove is exposed on a surface of the sample. After the cross section of the sample is polished so that the groove and its peripheral portions as shown in FIG. 2 appear on the cross section of the sample, the protrusion height (for example, T12 and T13 in FIG. 2) of the surface protrusion present in the peripheral portion of the groove is measured by observing the cross section using an optical microscope or a scanning electron microscope. The protrusion height is measured with respect to each of fifty grooves formed on the steel sheet to be measured. The average protrusion height is a value obtained by averaging the measurement results of fifty protrusion heights.

The shape of the surface protrusion is not particularly limited, and may be a protruding shape with a sharp tip end or a bank shape with a flat tip end when a cross section of a grain-oriented electrical steel sheet cut along a predetermined direction (a sheet width direction, a rolling direction, or the like) perpendicular to the surface of the steel sheet is viewed from the front.

The average protrusion width of the surface protrusion is not particularly limited, but may be 1 to 10 µm. The average protrusion width of the surface protrusion is an average of fifty measurement results obtained by measuring the protrusion widths of fifty surface protrusions formed on the steel sheet surface. A method of measuring the protrusion width is as follows. Firstly, a sample is taken from a steel sheet to be measured so that a cross section orthogonal to the longitudinal direction of the groove is exposed on a surface of the sample. After the cross section of the sample is polished so that a groove and its peripheral portions as shown in FIG. 2 appear on the cross section of the sample, the protrusion width (for example, the direct distance between a and b, and the direct distance between a' and b' in FIG. 2) of the surface protrusion present in the peripheral portion of the groove is measured by observing the cross section using an optical microscope or a scanning electron microscope. The protrusion width is measured with respect to each of fifty grooves formed on the steel sheet to be measured. The average protrusion width is a value obtained by averaging the measurement results of fifty protrusion widths.

In addition, in a case where the measurement results obtained by a surface roughness meter are the same as the measurement results obtained by using a method in which a cross section of a grain-oriented electrical steel sheet cut along the rolling direction perpendicular to the surface of the steel sheet is polished at a plurality of positions and observed with an optical microscope or a scanning electron microscope, the groove depth (the depth dimension of the groove) may be determined from the length dimension (the distance from the reference plane to the tip end of the groove) of the groove in the sheet thickness direction. Similarly, the protrusion height may be determined from the height dimension (distance in the sheet thickness direction) from the reference plane to the tip end of the surface protrusion.

As shown in FIG. 3, in the present electrical steel sheet 1, when the surface protrusion 12 (or 13) is viewed in a cross section including the longitudinal direction of the groove (sheet width direction Y) and the sheet thickness direction Z, the surface protrusion 12 includes specific portions each having a height of 50% or more with respect to a height of each peak point (P1, P2, P3, P4, and P5) appearing on a profile line of the surface protrusion 12. In the longitudinal direction of the groove, a total length Lsum (=LP1+LP2+LP3+LP5) of the specific portions is a length of 30% or more with respect to an overall length L of the surface protrusion 12. When viewing the peak points P3 and P4 shown in FIG. 3, a crest having the peak point P3 is gently connected to a crest having the peak point P4 in a region having a height of 50% or more with respect to the height of the peak point P3 present at the position higher than the peak point P4. In this case, the crest having the peak point P3 and the crest having the peak point P4 are considered one crest. In the longitudinal direction of the groove, a length of the specific portion having a height of 50% or more with respect to the height of the peak point P3 present at the highest position in the one crest is defined as the length LP3. Since the peak point P1, P2, and P5 do not apply to the above case, the length of each peak point in the longitudinal direction of the groove should be obtained. In other words, in the longitudinal direction of the groove, a length of the specific portion having a height of 50% or more with respect to the height of the peak point P1 in a crest having the peak point P1 is defined as the length LP1. In the longitudinal direction of the groove, a length of the specific portion having a height of 50% or more with respect to the height of the peak point P2 in a crest having the peak point P2 is defined as the length LP2. In the longitudinal direction of the groove, a length of the specific portion having a height of 50% or more with respect to the height of the peak point P5 in a crest having the peak point P5 is defined as the length LP5.

As described above, a ratio represented by (Lsum×100)/L is defined as a protrusion continuity indicator. In other words, in the present electrical steel sheet 1, the form of the surface protrusion is controlled so that the protrusion continuity indicator becomes 30% or more.

When the condition that the average protrusion height of the surface protrusion is more than 5 μm and not more than 10 μm is satisfied and the condition that the protrusion continuity indicator is 30% or more is satisfied, the effect of reducing iron loss of an iron core is significantly increased. When the protrusion continuity indicator is less than 30%, the effect of reducing iron loss of the iron core is not sufficiently obtained. In view of reducing iron loss of the iron core, the protrusion continuity indicator is preferably 50% or more. The upper limit of the protrusion continuity indicator is not particularly limited. The upper limit of the protrusion continuity indicator is mathematically 100%, but it is difficult to actually set the protrusion continuity indicator to 100%.

A method of measuring the protrusion continuity indicator is as follows.

A protrusion portion present at a position higher than the reference plane BL in the peripheral portion of the groove is identified by measuring an image of the steel sheet surface including the grooves using a device, such as a laser microscope, capable of measuring the three-dimensional shape of the steel sheet surface to be measured. A contour line indicating a height of 50% or more with respect to the height of the peak point of a continuous portion included in the protrusion portion is obtained using the above image. Then the protrusion continuity indicator is calculated based on a length of the contour line extending in the longitudinal direction of the groove.

As a method of forming a groove in the present electrical steel sheet 1, a laser irradiation method of forming a groove by irradiating to the steel sheet surface with a laser (refer to Japanese Unexamined Patent Application, First Publication No. 6-57335 and PCT International Publication No. WO2016/171124) is used.

Generally, preferable irradiation conditions used in the laser irradiation method are as follows. The laser output power is set to 200 W to 3000 W. The focused spot diameter (diameter including 86% of the laser output power) of the laser in the rolling direction is set to 10 μm to 100 μm. The focused spot diameter of the laser in the sheet width direction is set to 10 μm to 1000 μm. The laser scanning speed is set to 5 m/s to 100 m/s. The laser scanning pitch (interval) is set to 2 mm to 10 mm A desired groove shape can be obtained by appropriately adjusting these laser irradiation conditions within the above ranges.

The continuous oscillation type laser (laser capable of continuously oscillating) with a wavelength of 1.0 μm to 2.1 μm having high light collection may be used for forming grooves. For example, the fiber laser and the thin disc type solid laser including YAG laser are known as the above laser. The laser light with the wavelength of 1.0 μm to 2.1 μm is hardly absorbed into metal vapor and metal ion plasma generated at the processing point. If forming dot row grooves using the pulse oscillation laser, the effect of improving iron loss is reduced due to gaps between holes of the dot row grooves, but it is possible to suppress the effect of improving iron loss from being reduced by forming grooves using the continuous wave laser.

A laser that various laser mediums (excited atoms) are doped into a fiber core which is an oscillation medium may be used as the fiber laser. For example, the oscillation wavelength of the fiber laser that Yb (ytterbium) is doped into the fiber core is 1.07 μm to 1.08 μm. The oscillation wavelength of the fiber laser that Er (erbium) is doped into the fiber core is 1.55 μm. The oscillation wavelength of the fiber laser that Tm (thulium) is doped into the fiber core is 1.70 μm to 2.10 μm. In addition, the oscillation wavelength of the YAG laser which is a high power laser with the wavelength range similar to the above wavelength range is 1.06 μm. In a case of using the fiber laser or the YAG laser, the laser light is hardly absorbed into metal vapor and metal ion plasma generated at the processing point.

For keeping the high light collection, the focused spot diameter (focused beam diameter) may be 100 μm or less. The focused spot diameter of the fiber laser can be adjusted up to the same value as the core diameter of the fiber laser. For keeping the higher light collection, it is preferable to use the fiber laser having a core diameter of 100 μm or less. As the solid laser such as the YAG laser, the thin disc laser that the oscillation medium is the thin disc type crystal is known. In a case of using the thin disc laser, since the surface area of the crystal is large, it is easily to cool the oscillation medium. Therefore, even when the thin disc laser is driven with high output power, the deterioration of the light collection due to thermal distortion of the crystal hardly occurs and thereby it is possible to easily adjust the focused spot diameter to the fine diameter of 100 μm or less.

The focused spot diameter does not necessarily coincide with the groove width. For example, when the power density is large and the beam scanning speed V is slow, the groove width becomes larger than the focused spot diameter.

In a case of using the above high accuracy laser, for forming the surface protrusion having the desired height, the laser beam may be irradiated on the steel sheet surface while shifting (defocusing) the focal position of the laser beam. The defocused distance may be set within a range of ±1.2 mm from the focal position.

As described above, the cross sectional area of the groove, that is, the removal amount of molten substances is controlled by controlling the focused beam diameter, and thereby the amount of components generating the protrusion can be controlled. As a result, the protrusion height can be controlled.

In the general laser irradiation method, while the laser light is irradiated on the steel sheet surface, an assist gas such as an inert gas or air is sprayed to the portion irradiated with the laser beam. Such the assist gas has a role of removing the components generated by melting or evaporating the steel sheet with the laser irradiation. The assist gas is sprayed to the portion irradiated with the laser beam, and thereby the laser light reaches the steel sheet surface without being disturbed by the molten components or evaporated components. As a result, the grooves are formed stably.

The present inventors have found that the characteristic shape of the surface protrusion provided on the present electrical steel sheet 1 is obtained by varying the flow rate of the assist gas at time intervals of 0.02 to 0.2 msec while keeping the flow rate within a range of 0 to 100 (liter/minute). That is, in the present electrical steel sheet 1, the average protrusion height of the surface protrusion is more than 5 μm and not more than 10 μm, and the protrusion continuity indicator is 30% or more. For example, as disclosed in PCT International Publication (WO2016/171130), a method of spraying the assist gas at a constant flow rate set within a range of 10 to 1000 (liter/minute) has been already known. However, the above-described method of varying the flow rate of the assist gas at the specific time intervals is a novel method that has not been known at all.

The present inventors have found that the surface protrusions satisfying the specific conditions are formed on the steel sheet surface, and thereby the linear elastic strains similar to the strain introduction type laser domain control are introduced into the steel sheet when the stacked iron core is formed, and as a result, it is possible to reduce iron loss of the iron core.

The present inventors have diligently researched a method capable of forming grooves stably and reducing iron loss of the iron core based on the above knowledge. As a result, the present inventors have found the above-described method of varying the flow rate of the assist gas at the specific time intervals.

In addition, the flow rate of the assist gas may be controlled between a minimum value A1 and a maximum value A2 that are included in the range of 0 to 100 (liter/minute).

(3) Method of Forming Grooves

Figure 4:
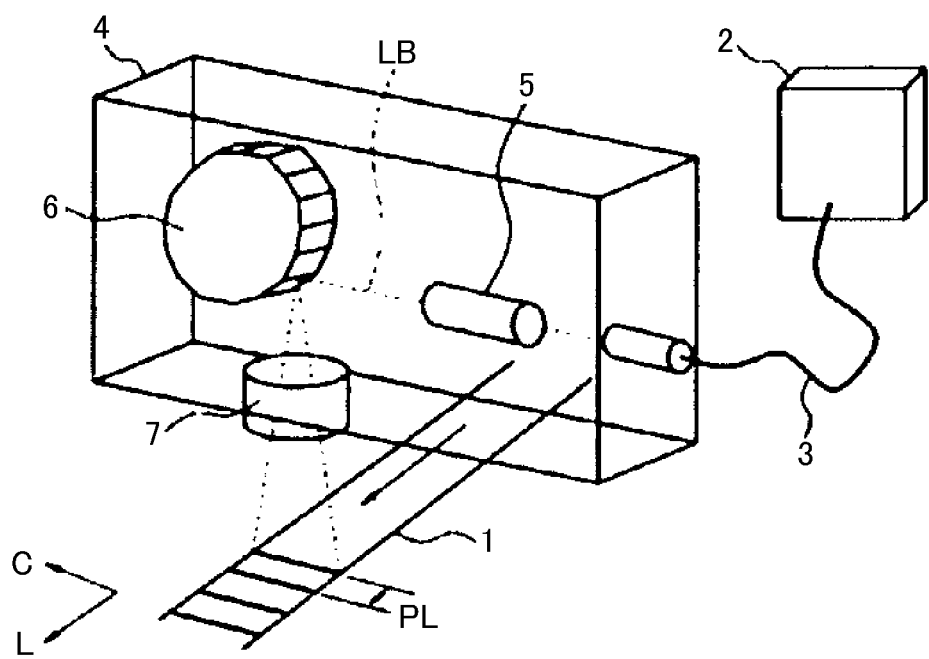
FIG. 4 is a schematic view showing an example of a manufacturing apparatus including a laser light source and a laser beam irradiation device used in the present embodiment.

FIG. 4 is a schematic view showing an example of a manufacturing apparatus including a laser light source and a laser beam irradiation device used in the present embodiment. FIG. 4 also shows an irradiation position of the laser light irradiated on the grain-oriented electrical steel sheet (steel sheet) 1. Hereinafter, an example of using a laser light source that is the fiber laser doped with Yb as a laser medium will be explained.

In FIG. 4, the steel sheet 1 is a grain-oriented electrical steel sheet obtained after the secondary recrystallization. The sheet width of the steel sheet 1 is 1000 mm, and the glass film is formed on the base metal surface of the steel sheet 1. The steel sheet 1 is transported at a constant line speed VL in a line direction L (rolling direction or transporting direction).

The laser device 2 is a commercial fiber laser with the maximum output power of 2000 W. Yb is doped into the fiber core as a laser medium. The oscillation wavelength of the fiber laser is 1.07 μm to 1.08 μm. The fiber core has a diameter of about 15 μm. The laser oscillation mode of the output beam is substantially basic Gaussian mode. The continuous wave (CW) laser light output from the laser device 2 passes through transmission fiber 3, such as an optical fiber, and reaches the laser irradiation device 4.

The laser irradiation device 4 includes a collimator 5, an icosahedral rotating polygon mirror 6, and an fθ lens 7 having a focal distance of 200 mm. The collimator 5 adjusts the diameter of the laser beam LB input from the transmission fiber 3. The rotating polygon mirror 6 scans the steel sheet 1 with the laser beam LB at a high speed in the sheet width direction C by polarizing the laser beam LB. The fθ lens 7 focuses the laser beam LB.

The beam scanning speed V on the steel sheet 1 can be adjusted within a range of 2 m/s to 50 m/s by adjusting the rotating speed of the rotating polygon mirror 6. The scanning width of the focused beam in the sheet width direction is about 150 mm on the steel sheet 1. The focused beam diameter (diameter including 86% of energy) d can be adjusted within a range of 10 μm to 100 μm by changing the output beam diameter using the collimator 5. A non-illustrated focusing mechanism is provided between the rotating polygon mirror 6 and the fθ lens 7 having the focal distance of 200 mm. A distance between the fθ lens 7 and the steel sheet can be adjusted by the focusing mechanism. The laser beam is reflected by one plane of the rotating polygon mirror 6 and thereby the steel sheet 1 is scanned with the laser beam. As a result, one groove having a predetermined length (for example, total length in the sheet width direction) is formed on the steel sheet 1 in the sheet width direction. The interval between grooves adjacent each other in the L direction, that is, the irradiation pitch PL in the rolling direction (transporting direction) can be changed by adjusting the line speed VL and the rotating speed of the rotating polygon mirror 6.

As described above, the grooves are formed at the constant scanning intervals PL (irradiation pitches or groove intervals) in the rolling direction by irradiating the laser beam LB on the steel sheet 1 using the laser irradiation device 4. In other words, by scanning the steel sheet surface with the laser beam while irradiating the laser beam on the steel sheet surface, the grooves having a predetermined length and extending in a direction substantially perpendicular to the rolling direction of the grain-oriented electrical steel sheet are formed at the predetermined intervals in the transporting direction. The direction substantially perpendicular to the rolling direction is a direction across the rolling direction or a direction including a vector perpendicular to the rolling direction. For example, the direction substantially perpendicular to the rolling direction is a direction included in a range of ±45° from the direction perpendicular to the rolling direction.

In addition, as described above, when irradiating the laser beam, the flow rate of the assist gas is controlled so that the flow rate varies at time intervals of 0.02 to 0.2 msec while keeping the flow rate within a range of 0 to 100 (liter/minute).

After the laser beam is irradiated on the steel sheet 1, an insulation coating is formed on the surface of the steel sheet 1 using a non-illustrated coating device in order to add electrical insulation and tension to the steel sheet 1.

The present invention is not limited to the above embodiment. The above embodiment is an example, and any embodiment having substantially the same configuration as the technical idea of the present invention and having the same operational effect is included in the scope of the present invention.

EXAMPLES

Examples 1 and 2, Comparative Examples 1 to 7

A high flux density grain-oriented electrical steel sheet that a value of flux density B8 in a magnetic field of 800 A/m is 1.94 T was prepared. The oval laser beam was irradiated on the prepared steel sheet using a fiber laser with an output power of 3 kW. The length of the oval laser beam in the rolling direction of the prepared steel sheet was 40 μm. The length of the oval laser beam in the sheet width direction of the prepared steel sheet was 100 μm. By scanning the prepared steel sheet with the oval laser beam at a scanning speed of 20 m/s, linear grooves were formed on the prepared steel sheet at intervals of 5 mm in the rolling direction. Each of the grooves had a width of about 40 μm and a depth of about 20 μm.

In Example 1, when the laser beam was irradiated on the steel sheet surface, the height position (−0.8 mm) of the steel sheet surface was set to a position 0.8 mm closer from the focal position of the laser beam. In Example 2, when the laser beam was irradiated on the steel sheet surface, the height position (+0.9 mm) of the steel sheet surface was set to a position 0.9 mm away from the focal position. In Comparative Example 1, when the laser beam was irradiated on the steel sheet surface, the height position (±0 mm) of the steel sheet surface was set to the focal position. In Comparative Example 2, when the laser beam was irradiated on the steel sheet surface, the height position (−0.4 mm) of the steel sheet surface was set to a position 0.4 mm closer from the focal position. In Comparative Example 3, when the laser beam was irradiated on the steel sheet surface, the height position (+0.5 mm) of the steel sheet surface was set to a position 0.5 mm away from the focal position. In Comparative Example 4, when the laser beam was irradiated on the steel sheet surface, the height position (+1.1 mm) of the steel sheet surface was set to a position 1.1 mm away from the focal position. In Comparative Example 5, when the laser beam was irradiated on the steel sheet surface, the height position (−1.2 mm) of the steel sheet surface was set to a position 1.2 mm closer from the focal position. In Comparative Example 6, when the laser beam was irradiated on the steel sheet surface, the height position (+0.8 mm) of the steel sheet surface was set to a position 0.8 mm away from the focal position. In Comparative Example 7, when the laser beam was irradiated on the steel sheet surface, the height position (−1.1 mm) of the steel sheet surface was set to a position 1.1 mm closer from the focal position.

The flow rate of the assist gas was controlled so as to vary at specific time intervals in accordance with conditions (minimum value A1 and maximum value A2 of the assist gas flow rate, and variable time interval of the assist gas flow rate) shown in Table 1. In Comparative Examples 1 to 5, the assist gas flow rate was controlled so that the minimum value A1 became equal to the maximum value A2, and the assist gas flow rate was controlled so as not to vary temporally. That is, the assist gas flow rate was controlled so as to be constant.

Table 1 shows measurement results of the average groove width, the average groove depth, the average protrusion height, the protrusion continuity indicator, the magnetic flux density, and the iron loss of the obtained grain-oriented electrical steel sheet.

A single sheet (W100 mm X L500 mm) was taken from the grain-oriented electrical steel sheet. After stress relief annealing was performed with respect to the single sheet at 800° C. for two hours, the iron loss of the single sheet was evaluated by the single sheet tester method. W17/50 is iron loss measured on conditions that the maximum magnetic flux density is 1.7 T and the excitation frequency is 50 Hz. The magnetic flux density B8 is defined as a magnetic flux density [T] generated within the magnetic field having the magnetizing force H of 800 A/m. Especially, in a case of the grain-oriented electrical steel sheet, the magnetic flux density B8 is a magnetic flux density when the steel sheet is magnetized in the rolling direction. Generally, the higher the magnetic flux density B8, the higher the crystal orientation of the steel sheet and the lower the iron loss.

A protrusion portion present at a position higher than the reference plane BL in the peripheral portion of the groove was identified by measuring an image of the steel sheet surface including the grooves using a device, such as a laser microscope, capable of measuring the three-dimensional shape of the steel sheet surface to be measured. A contour line indicating a height of 50% or more with respect to the height of the peak point of a continuous portion included in the protrusion portion was obtained using the above image. The protrusion continuity indicator was calculated based on the length of the contour line extending in the longitudinal direction of the groove.

TABLE 1

| | Flow rate of assist gas | | | Average groove width (μm) | Average groove depth (μm) | Average protrusion height (μm) | Protrusion continuity indicator (%) | Magnetic flux density B8 (T) | Iron loss W17/50 (W/kg) |
|---|---|---|---|---|---|---|---|---|---|
| | Minimum value A1 (liter/minute) | Maximum value A2 (liter/minute) | Variation time interval (msec) | | | | | | |
| Comparative Example 1 | 500 | 500 | Not varied | 50 | 21 | 1.1 | 12 | 1.91 | 0.73 |
| Comparative Example 2 | 300 | 300 | Not varied | 51 | 20 | 3.3 | 22 | 1.90 | 0.73 |
| Comparative Example 3 | 100 | 100 | Not varied | 52 | 20 | 4.6 | 40 | 1.91 | 0.75 |
| Example 1 | 10 | 100 | 0.19 | 53 | 20 | 5.8 | 30 | 1.91 | 0.74 |
| Example 2 | 1 | 70 | 0.05 | 54 | 19 | 7.3 | 63 | 1.90 | 0.73 |
| Comparative Example 4 | 70 | 70 | Not varied | 53 | 20 | 10.3 | 23 | 1.91 | 0.75 |
| Comparative Example 5 | 10 | 10 | Not varied | 55 | 20 | 15.2 | 35 | 1.90 | 0.73 |
| Comparative Example 6 | 80 | 300 | 0.5 | 56 | 21 | 6.6 | 21 | 1.91 | 0.75 |
| Comparative Example 7 | 10 | 50 | 0.3 | 52 | 20 | 13.4 | 45 | 1.90 | 0.74 |

Single-phase wound iron cores each having output power of 20 kVA were made by the grain-oriented electrical steel sheets used in Examples 1 to 2 and Comparative Examples 1 to 7. For each of the single-phase wound iron cores, the stress relief annealing was performed at 800° C. for two hours within an atmosphere of 100% nitrogen. After a primary coil (excitation coil) and a secondary coil (search coil) were wound onto each of the wound iron cores, iron loss of each of the wound iron cores was measured by a wattmeter. Table 2 shows measurement results.

TABLE 2

| | Average protrusion height (μm) | Protrusion continuity indicator (%) | Iron loss of core W17/50 (W) |
|---|---|---|---|
| Comparative Example 1 | 1.1 | 12 | 20.7 |
| Comparative Example 2 | 3.3 | 40 | 20.9 |
| Comparative Example 3 | 4.6 | 22 | 20.2 |
| Example 1 | 5.8 | 30 | 19.1 |
| Example 2 | 7.3 | 63 | 18.9 |
| Comparative Example 4 | 10.3 | 23 | 20.3 |
| Comparative Example 5 | 15.2 | 35 | 22.5 |

TABLE 2-continued

|  | Average protrusion height (μm) | Protrusion continuity indicator (%) | Iron loss of core W17/50 (W) |
|---|---|---|---|
| Comparative Example 6 | 6.6 | 21 | 20.8 |
| Comparative Example 7 | 13.4 | 45 | 23.0 |

As shown in Table 1, Examples 1 and 2 showed that the average protrusion height and the protrusion continuity indicator could be controlled within a range of the present invention by controlling the assist gas flow rate so as to vary at time intervals of 0.02 to 0.2 msec while keeping the flow rate within a range of 0 to 100 (liter/minute). In other word, in Examples 1 and 2, the average protrusion height could be controlled to be more than 5 μm and not more than 10 μm, and the protrusion continuity indicator could be controlled to be 30% or more. In contrast, in Comparative Examples 1 to 7, since the assist gas flow rate was not controlled appropriately, at least one of the average protrusion height and the protrusion continuity indicator could not be controlled within a range of the present invention.

However, as shown in Table 1, it is found that there is no significant difference in the magnetic flux density and the iron loss between Examples and Comparative Examples when the electrical steel sheet alone is viewed. That is, the average protrusion height and the protrusion continuity indicator do not significantly affect the magnetic flux density and iron loss of the electrical steel sheet alone.

On the other hand, as shown in Table 2, in Examples 1 and 2, it could be seen that the average protrusion height and the protrusion continuity indicator were controlled within the ranges of the present invention, and as a result, the iron loss of the core was lower than those of Comparative Examples 1 to 7. That is, it could be seen that a low iron loss wound core is obtained when a wound core is produced using the grain-oriented electrical steel sheet of the present invention in which the average protrusion height of the surface protrusion is more than 5 μm and not more than 10 μm, and the protrusion continuity indicator is 30% or more.

BRIEF DESCRIPTION OF THE REFERENCE SYMBOLS

1 grain-oriented electrical steel sheet
2 laser device
3 optical fiber (transmission fiber)
4 laser irradiation device
5 collimator
6 polygon mirror (rotating polygon mirror)
7 fθ lens
10 groove (linear)
11 groove (intermittent linear)
12 surface protrusion
13 surface protrusion
100 peripheral portion
110 peripheral portion

The invention claimed is:

1. A grain-oriented electrical steel sheet that has a steel sheet surface provided with a plurality of grooves, wherein each groove of the plurality of grooves is a groove comprising:
   a surface protrusion that protrudes from the steel sheet surface in a region expanding outward in a width direction of the groove from a widthwise end portion of the groove, the surface protrusion extending along a longitudinal direction of the groove,
   wherein an average protrusion height of the surface protrusion is more than 5 μm and not more than 10 μm,
   when the surface protrusion is viewed in a cross section including the longitudinal direction of the groove and a normal direction of the steel sheet surface, the surface protrusion includes specific portions each having a height of 50% or more with respect to a height of each peak point appearing on a profile line of the surface protrusion, and
   in the longitudinal direction of the groove, a total length of the specific portions is a length of 30% or more with respect to an overall length of the surface protrusion.

\* \* \* \* \*